United States Patent [19]

Fisher

[11] 4,192,153

[45] Mar. 11, 1980

[54] HOOKES JOINT YOKE

[75] Inventor: Leslie G. Fisher, Birmingham, England

[73] Assignee: GKN Transmissions Limited, Birmingham, England

[21] Appl. No.: 10,385

[22] Filed: Feb. 8, 1979

[30] Foreign Application Priority Data

Feb. 23, 1978 [GB] United Kingdom ............... 7204/78

[51] Int. Cl.² ............................................. F16D 3/26
[52] U.S. Cl. ................................... 64/17 R; 403/57; 403/157
[58] Field of Search ............... 403/57, 58, 67, 71, 403/74, 150, 157, 161, 164; 64/17, 4

[56] References Cited

U.S. PATENT DOCUMENTS

| | | |
|---|---|---|
| 1,656,659 | 1/1928 | Brown ..................................... 64/17 |
| 1,695,116 | 12/1928 | Lord ..................................... 403/58 X |
| 2,512,690 | 6/1950 | Smith et al. ....................... 403/57 X |

*Primary Examiner*—Wayne L. Shedd
*Attorney, Agent, or Firm*—Merriam, Marshall & Bicknell

[57] ABSTRACT

A yoke for a hookes universal joint, formed of a lightweight metal and having a base, two limbs extending axially from the base, the limbs having reinforcing flanges at least adjacent to the base and the thickness of the base being such that the limbs and base form a generally U-shaped structure of high rigidity.

3 Claims, 4 Drawing Figures

HOOKES JOINT YOKE

BACKGROUND TO THE INVENTION

1. Field of the Invention

This invention relates to hookes type universal joint.

An application in which large numbers of joints are currently used is motor vehicle transmission shafts, particularly in the longitudinally extending shaft known as the propeller shaft used for transmitting power from a forwardly mounted power unit to the rear wheels of the vehicle. The propeller shaft typically has a hookes joint at each end, one yoke member of each joint being permanently secured to the shaft. The general practice hitherto has been to make the shaft of steel of appropriate quality and the hookes joint yokes of a ferrous metal, which, although it is a construction which is effective, carries a considerable weight penalty. Weight reduction wherever possible in motor vehicles is currently assuming increasing importance.

It is the object of the present invention to provide a construction of yoke for hookes joint which can be made of a lightweight material, in particular a light metal such as aluminium alloy, whilst still providing sufficient strength for the relatively arduous service conditions encountered in motor vehicle transmission systems.

SUMMARY OF THE INVENTION

According to the present invention, we provide a yoke for a hookes joint, formed of a lightweight metal and having a base, two limbs extending from the base generally parallel to and spaced from the rotational axis thereof and provided with apertures for receiving bearings to mount the cruciform member of the joint, the limbs having generally axially extending edge regions which are provided with reinforcing flanges at least adjacent the base of the yoke, and the dimension of the base of the yoke measured parallel to said axis, at least in the regions between the adjacent base parts of the opposite limbs, being at least as great as the thickness of the portions of the limbs provided with the reinforcing flanges.

The base may be provided with ribs disposed on the side of the base opposite to that from which the limbs extend, each rib extending between the adjacent edge portions of the two opposite limbs.

By virtue of such construction, a lightweight joint yoke is provided of adequate strength, whilst keeping the quantity of metal utilised in its manufacture to a minimum.

BRIEF DESCRIPTION OF THE DRAWINGS

These and other features of the invention will now be described by way of example with reference to the accompanying drawings, of which.

DESCRIPTION OF PREFERRED EMBODIMENTS

Figure 1:
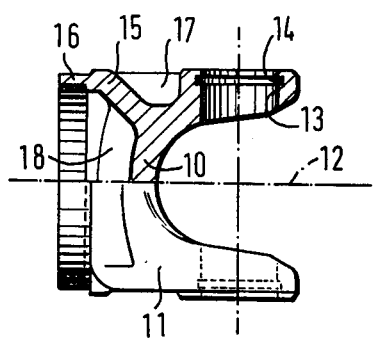
FIGS. 1 and 2 are half sections on the axis of rotation of one embodiment of joint yoke according to the invention, taken in planes at right angles to one another.
Figure 2:
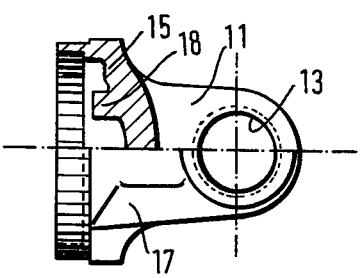

Referring firstly to FIGS. 1 and 2, there is illustrated a yoke for a hookes joint, comprising a base 10 and two parallel limbs 11 which extend axially from the base on opposite sides and spaced equally from the axis of rotation 12 of the yoke. The limbs 11 are provided with apertures 13 for receiving bearings to support opposite limbs of the cruciform member, not shown, of the universal joint. The apertures 13 are provided with grooves as shown at 14, or other formations of known type for retaining the bearings in position therein.

The base 10 comprises a central portion which extends between the limbs 11, such central portion being connected by way of an annular outwardly and rearwardly extending region 15 to a spigot 16 which provides for attachment, e.g. by welding, of the yoke to a transmission shaft. The limbs 11 have, adjacent the base of the yoke, reinforcing flanges 17 which extend along the axial edges of the limbs and which merge into the base 10. On the side of the base 10 opposite that from which the limbs 11 extend, two arcuate ribs 18 extend parallel to one another across the base between the regions of the respective adjacent edge portions of the two opposite limbs.

The dimension of the base of the yoke, measured parallel to the axis 12. Where the ribs 18 are provided, is approximately the same as the thickness of the limbs 11 where the reinforcing flanges 17 are present. The flanges 17 and ribs 18, and limbs and base, thus form a generally U-shaped structure of high rigidity.

The yoke is made from a relatively light metal, namely an aluminium alloy. Various techniques may be used for the manufacture of the yoke, e.g. gravity die casting, low or high pressure die casting, conventional forging, or forging of the alloy during its solidification from the liquid state. A minimum quantity of metal is used in the construction of the yoke, but the presence of the reinforcing ribs and flanges where described imparts sufficient strength for the yoke. In particular, it is believed that the strength of the yoke is derived from the generally U-shaped structure constituted by the limbs and base, which tends to prevent distortion and misalignment of the limbs under torque transmitting conditions.

Figure 3:
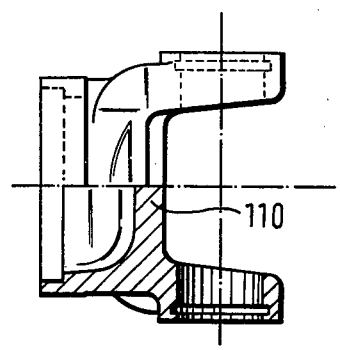
FIGS. 3 and 4 are views corresponding to FIGS. 1 and 2, of a further embodiment of joint yoke according to the invention.
Figure 4:
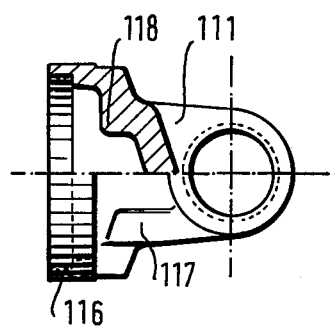

Referring now to FIGS. 3 and 4 of the drawings, the principle features thereof are generally described above with reference to FIGS. 1 and 2, and like parts are denoted by like reference numerals with the prefix 1. Thus the yoke comprises a base 110 and limbs 111, the base having a central portion from which the limbs extend and a spigot portion 116 for attachment to a transmission shaft tube. The limbs have reinforcing flanges 117 extending along their axial edges, and beneath the base, ribs 118 are provided. In this yoke, however, the ribs 118 do not stand free but merge into the material of the base.

A yoke as described may be secured to a propeller shaft by welding, e.g. friction welding, if the shaft is of a compatible material, or by an adhesive technique or mechanical fastening if the shaft is not welding compatible, e.g. a fibre-resin composite material.

I claim:

1. A yoke for a hookes joint, comprising a base and two limbs extending from the base generally parallel to and spaced from the rotational axis thereof and defining apertures for receiving bearings to mount a cruciform member of the joint, wherein the yoke is formed of a lightweight metal and the limbs have generally axially extending edge regions which are provided with reinforcing flanges at least adjacent the base of the yoke, and the dimension of the base of the yoke measured parallel to said axis, at least in the region between adjacent base parts of the opposite limbs, is at least as great as the thickness of the portions of the limbs provided with said reinforcing flanges.

2. A yoke according to claim 1 wherein the base is provided with ribs disposed on the side of the base opposite to that from which the limbs extend, each rib extending between the adhacent edge portions of the two opposite limbs.

3. A yoke according to claim 1 wherein it is formed of an aluminium alloy.

* * * * *